Figure 1:
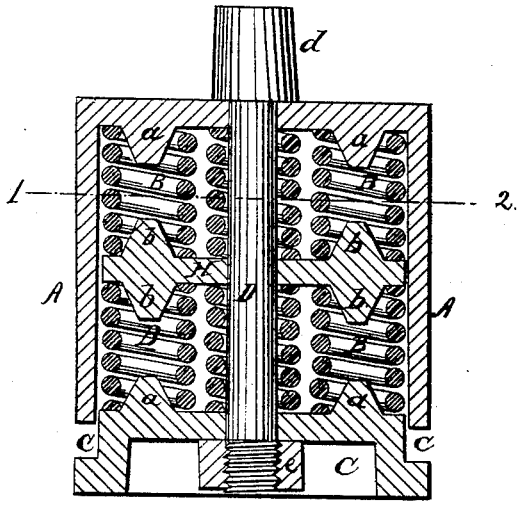
Figure 2:
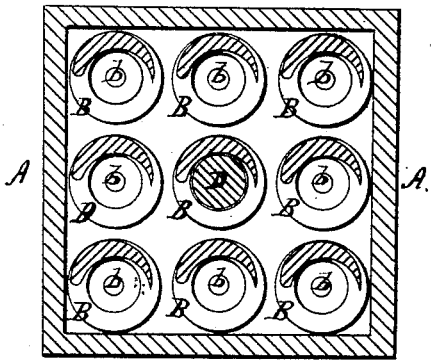

A. B. DAVIS.

Car Spring.

No. 241. A. I. Patented June 28, 1859.

Witnesses:

Henry Howson

Chas. E. Foster.

Inventor:

A. B. Davis

AM. PHOTO-LITHO. CO. N.Y. (OSBORNE'S PROCESS.)